United States Patent
Texada et al.

(10) Patent No.: US 11,949,696 B2
(45) Date of Patent: Apr. 2, 2024

(54) DATA SECURITY SYSTEM WITH DYNAMIC INTERVENTION RESPONSE

(71) Applicant: Bank of America Corporation, Charlotte, NC (US)

(72) Inventors: Jeffrey Wayne Texada, Carrollton, TX (US); Steven E. Sinks, Scottsdale, AZ (US)

(73) Assignee: Bank of America Corporation, Charlotte, NC (US)

( * ) Notice: Subject to any disclaimer, the term of this patent is extended or adjusted under 35 U.S.C. 154(b) by 348 days.

(21) Appl. No.: 17/645,034

(22) Filed: Dec. 17, 2021

(65) Prior Publication Data

US 2023/0199004 A1 Jun. 22, 2023

(51) Int. Cl.
*H04L 9/40* (2022.01)
*H04L 67/147* (2022.01)

(52) U.S. Cl.
CPC ...... *H04L 63/1416* (2013.01); *H04L 63/1425* (2013.01); *H04L 63/20* (2013.01); *H04L 67/147* (2013.01)

(58) Field of Classification Search
CPC . H04L 63/1416; H04L 63/1425; H04L 63/20; H04L 67/147; H04L 41/16; G06N 20/00; G06N 3/08; G06N 20/20; G06N 20/10; G06N 3/02; G06N 3/088; G06N 3/042; G06F 2009/45575
See application file for complete search history.

(56) References Cited

U.S. PATENT DOCUMENTS

| | | | |
|---|---|---|---|
| 7,461,398 B2 | 12/2008 | Aaron | |
| 7,627,896 B2 | 12/2009 | Herrmann | |
| 7,793,338 B1 | 9/2010 | Beddoe et al. | |
| 7,805,752 B2 | 9/2010 | Newstadt et al. | |
| 8,140,664 B2 | 3/2012 | Huang et al. | |
| 8,185,933 B1 | 5/2012 | Palmer | |
| 8,281,396 B2 | 10/2012 | Ali-Ahmad et al. | |
| 8,312,261 B2 | 11/2012 | Rao et al. | |
| 8,452,956 B1 | 5/2013 | Kersey et al. | |
| 8,479,267 B2 | 7/2013 | Donley et al. | |
| 8,763,076 B1 | 6/2014 | Satish et al. | |
| 8,782,800 B2 | 7/2014 | Brennan et al. | |
| 8,938,799 B2 | 1/2015 | Kuo | |
| 9,245,123 B1 | 1/2016 | Satish | |
| 9,286,182 B2 * | 3/2016 | Fries | G06F 11/301 |
| 9,356,917 B2 | 5/2016 | Balasaygun et al. | |
| 9,473,522 B1 | 10/2016 | Kotler et al. | |

(Continued)

*Primary Examiner* — Techane Gergiso

(57) ABSTRACT

A system determines baseline deployment properties of operating system deployments stored by a deployment repository and endpoint deployment properties of a deployed operating system executed by an endpoint device. An artificial intelligence model is configured to determine a security response based at least in part on the endpoint deployment properties of the endpoint device. By providing the endpoint deployment properties to the artificial intelligence model, a mismatch value is determined that corresponds to an amount that the endpoint deployment properties are different than the baseline deployment properties. Based on the mismatch value, an action is determined to improve security of the deployed operating system executed by the endpoint device. The determined action is executed to improve security of the deployed operating system.

20 Claims, 3 Drawing Sheets

(56) References Cited

U.S. PATENT DOCUMENTS

| | | |
|---|---|---|
| 9,635,690 B2 | 4/2017 | Palin et al. |
| 9,838,405 B1 | 12/2017 | Guo et al. |
| 9,923,918 B2 | 3/2018 | Nicodemus et al. |
| 10,003,608 B2 | 6/2018 | Treat et al. |
| 10,045,217 B2 | 8/2018 | Stan et al. |
| 10,122,760 B2 | 11/2018 | Terrill et al. |
| 10,228,931 B2 * | 3/2019 | Singh ................. G06N 3/08 |
| 10,380,344 B1 | 8/2019 | David et al. |
| 10,382,459 B2 | 8/2019 | Harris et al. |
| 10,511,636 B2 | 12/2019 | Vaidya et al. |
| 10,516,531 B2 | 12/2019 | Schtz et al. |
| 10,542,030 B2 | 1/2020 | Oberheide et al. |
| 10,666,686 B1 | 5/2020 | Singh et al. |
| 10,778,725 B2 | 9/2020 | Ray et al. |
| 10,848,517 B1 | 11/2020 | Yampolskiy et al. |
| 10,885,213 B2 | 1/2021 | Teal |
| 10,896,254 B2 | 1/2021 | Mckerchar et al. |
| 10,986,122 B2 | 4/2021 | Bloxham et al. |
| 10,986,124 B2 | 4/2021 | Thomas et al. |
| 11,237,857 B2 * | 2/2022 | Saxena ............... G06F 9/542 |
| 11,330,081 B1 * | 5/2022 | Fellers .............. H04L 41/0886 |
| 11,494,200 B2 * | 11/2022 | Liang .................. G06N 20/00 |
| 11,822,911 B1 * | 11/2023 | Benskin ................ G06F 8/61 |
| 2004/0107173 A1 * | 6/2004 | Cheng .................. G06N 5/00 |
| | | 706/54 |
| 2012/0323853 A1 * | 12/2012 | Fries ................... G06F 11/301 |
| | | 707/649 |
| 2017/0359306 A1 | 12/2017 | Thomas et al. |
| 2018/0129492 A1 * | 5/2018 | Singh .................... G06N 5/04 |
| 2018/0357448 A1 | 12/2018 | Anderson et al. |
| 2019/0171811 A1 * | 6/2019 | Daniel ................. G06F 21/53 |
| 2019/0182272 A1 | 6/2019 | Palumbo et al. |
| 2019/0258807 A1 * | 8/2019 | DiMaggio ........... G06F 21/577 |
| 2019/0260785 A1 | 8/2019 | Jenkinson et al. |
| 2019/0339989 A1 * | 11/2019 | Liang ................. G06F 16/907 |
| 2020/0286035 A1 | 9/2020 | Berger et al. |
| 2020/0412747 A1 | 12/2020 | Paine |
| 2021/0256427 A1 * | 8/2021 | Schott ................. G06N 20/10 |
| 2022/0278984 A1 * | 9/2022 | Sarel ................. H04L 63/0876 |
| 2022/0417252 A1 * | 12/2022 | Moon ................. H04L 63/068 |
| 2022/0417286 A1 * | 12/2022 | Moon ................... H04L 63/02 |

* cited by examiner

DATA SECURITY SYSTEM WITH DYNAMIC INTERVENTION RESPONSE

TECHNICAL FIELD

The present disclosure relates generally to data security, and more specifically to a data security system with dynamic intervention response.

BACKGROUND

An entity or organization may define a standard operating system or application configuration as a predefined deployment that can used by a number of endpoint devices associated with the organization. After these operating systems are deployed to the endpoint devices, changes to the operating system can occur. Most changes are benign, but some changes can result in compromised data security. There exists a need for improved technology for identifying and resolving such security compromises.

SUMMARY

Modifications to a standard operating system or application executed on an endpoint device could not previously be evaluated and addressed in a holistic manner. For instance, whether changes to a deployed operating system might warrant a security response went unchecked unless very specific predefined files known to be malicious are identified in the system. This resulted in only a small subset of potential security issues being identified, while other instances go unidentified and unresolved.

Certain embodiments of this disclosure are integrated into the practical application of a security alert and intervention system that solves technical problems of previous technology, including those described above. For example, the disclosed security alert and intervention system provides several technical improvements and advantages which may include 1) the ability to provide automatically recommended security responses that are tailored using a response hierarchy to address changes to and/or use of a deployed operating system; 2) the ability to implement immediate interventions (e.g., to block or delay access to services or applications in an operating system), while an alert is sent to an administrator that provides contextual information for confirming, canceling, or modifying the intervention; and 3) the ability to automatically update a model used to determine security response actions based on how administrators prevent or allow certain usage of and/or changes to deployed operating systems over time. As such, this disclosure may improve the function of computer systems used for detecting computer and data security vulnerabilities associated with usage and/or changes to preconfigured operating systems and/or applications deployed to endpoint devices. In addition to improving computer security, the security alert and intervention system simultaneously improves the usability of endpoint devices by striking an enhanced balance between allowing some freedom for endpoint users to make changes to and use an operating system relatively freely so that tasks to be completed with ease and efficiency, while security is still prioritized and possible security compromise is addressed using tailored interventions. The security alert and intervention system also updates what standard endpoint activities are allowed based on usage over time. For example, the security alert and intervention system may employ artificial intelligence to identify known files that are allowable and learn patterns based on user interaction with endpoint devices. Rather than being reactive to specific known security threats, the security alert and intervention system facilitates proactive learning of baseline usage of endpoint devices and detection of departures from baseline usage based on how endpoint devices are used over time. A tailored security response is then recommended and/or executed to address instances where endpoint device usage departs from the learned baselines usage. The security alert and intervention system of this disclosure makes it difficult or impossible to use endpoint devices in an unapproved or malicious manner, while also reducing response times to any unapproved use from hours or days to minutes or near real-time responses.

Certain embodiments of this disclosure may include some, all, or none of these advantages. These advantages, and other features, will be more clearly understood from the following detailed description taken in conjunction with the accompanying drawings and claims.

In an embodiment, an endpoint security system includes a deployment repository, an endpoint device, and a security assessment and intervention system. The deployment repository stores operating system deployments indicating configurations of one or more operating systems that can be executed by endpoint devices. The endpoint device executes a deployed operating system. The endpoint device is configured to record one or both of modifications to the deployed operating system and usage of the deployed operating system. The security assessment and intervention system includes a network interface that receives baseline deployment properties of the operating system deployments stored by the deployment repository and endpoint deployment properties of the deployed operating system executed by the endpoint device. The endpoint deployment properties include one or more of the modifications to the deployed operating system recorded by the endpoint device and the usage of the deployed operating system recorded by the endpoint device. A memory stores an artificial intelligence model configured to determine a security response based at least in part on the endpoint deployment properties of the endpoint device. A processor is communicatively coupled to the network interface and memory. The processor determines, by providing the endpoint deployment properties to the artificial intelligence model, a mismatch value corresponding to an amount that the endpoint deployment properties are different than the baseline deployment properties. Based on the mismatch value, an action is determined to improve security of the deployed operating system executed by the endpoint device. The determined action is performed to improve security of the deployed operating system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, in some cases, how an operating system is used or modified may result in security vulnerabilities. In some cases, the security vulnerabilities may be unintentional, such as if an endpoint user unknowingly installs software that introduces a security vulnerability or accesses a network location that presents a security threat. In other cases, an endpoint user may intentionally make changes to or use an operating system (e.g., by installing software, accessing unsecure networks, etc.) in a way that introduces a security vulnerability. In such cases, the user may make efforts to mask the potential security compromise. For example, a user may change the name and/or file location of a malicious file in an attempt to mask its purpose, or a user may attempt to disguise security compromising activities by performing them only once or a few times within a large number of similar but non-security compromising activities. This disclosure provides various resources for improving security vulnerability assessment technologies by detecting even seemingly minor or brief security compromising events and initiating appropriate interventions, such as by permanently or temporarily blocking capabilities of a compromised endpoint device and alerting an administrator with contextual information about the security compromising event. The disclosed system can detect both non-intentional and intentional security compromising events and suggest or automatically implement appropriate actions for resolution. In some embodiments, the system continuously improves this detection and intervention approach based on how administrators respond to different security scenarios, such that interventions can be more reliably initiated with little or no delay for review by an administrator.

Example Endpoint Security System

Figure 1:
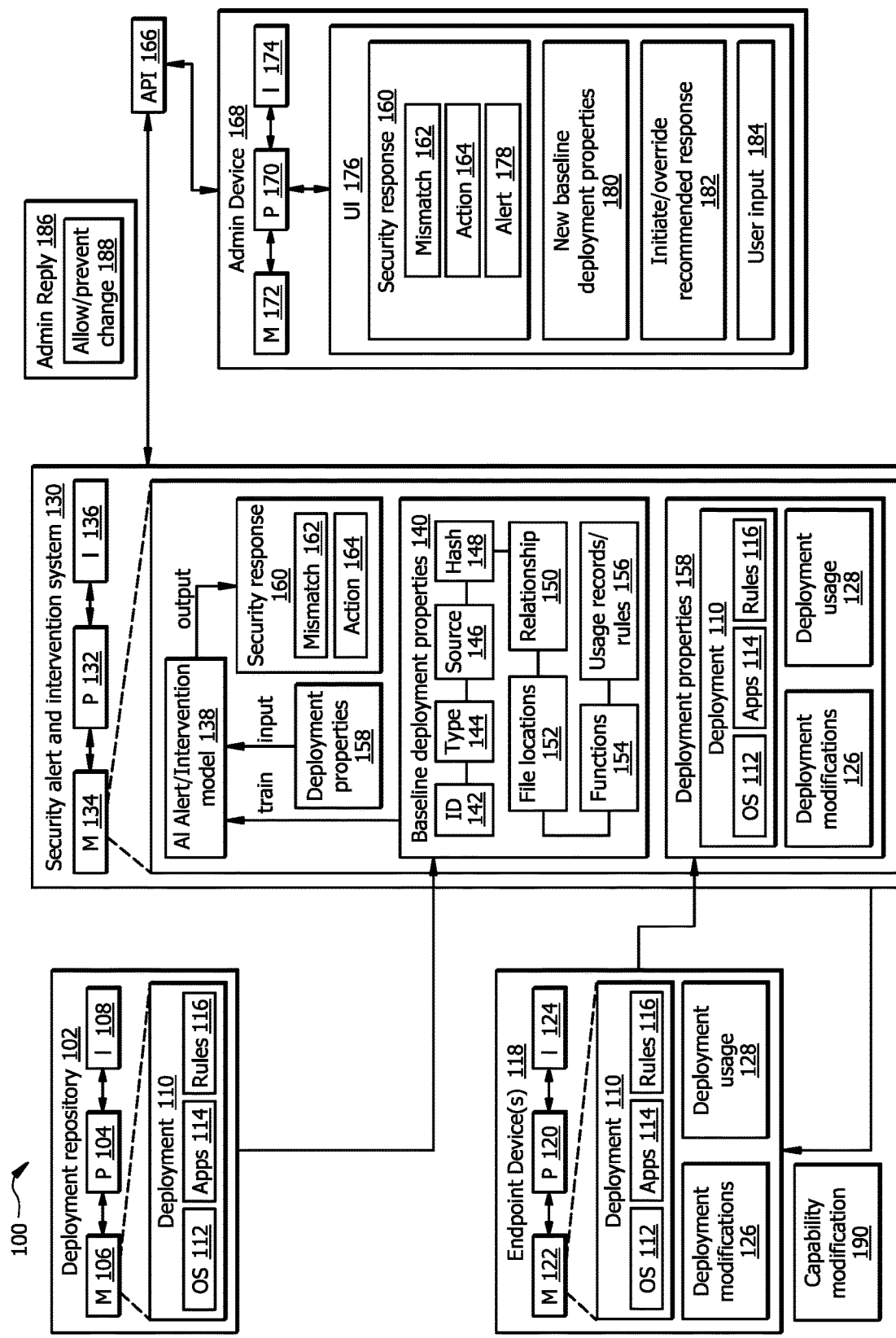
FIG. 1 is a diagram illustrating an example endpoint security system.

FIG. 1 is a schematic diagram of an example endpoint security system 100 for detecting and responding to potential security compromise of endpoint devices 118. The endpoint security system 100 includes a deployment repository 102, one or more endpoint devices 118, a security alert and intervention system 130, and an administrator device 168. The security alert and intervention system 130 is generally configured to determine a security response 160 for when deployment modifications 126 and/or deployment usage 128 indicate a possible security compromise of an endpoint device 118. The security response 160 includes an action 164 that can be implemented automatically and/or with administrator approval to improve security of the endpoint device 118 (e.g., by causing a capability modification 190). Details of the structure and operation of each component of the endpoint security system 100 are described further in the subsections below. An example method of operating the endpoint security system 100 is described with respect to FIG. 4 below.

As described in greater detail below, a specially trained alert/intervention model 138 of the security alert and intervention system 130 uses information (e.g., the deployment modifications 126 and/or deployment usage 128 described further below) from software running on endpoint devices 118. This information may be used to identify known allowable files/folders on the endpoint device 118. To determine this information, the endpoint devices 118 may parse file/folder names, file content, and metadata then report back to the security alert and intervention system 130 with the file name, location, and hash value associated with the content and file identified (e.g., as part of the deployment properties 158).

The alert/intervention model 138 not only facilitates an improved security response 160 but also can be improved over time to determine whether deployment modifications 126 and/or usage 128 at endpoint devices 118 (e.g., files, file content, and/or the file actions) align with allowable activities or may be malicious in nature. For example, the alert/intervention model 138 may indicate a baseline or standard usage of individual endpoint devices 118 that is based on patterns of the usage of the endpoint devices 118. For example, the alert/intervention model 138 may indicate a different pattern of allowable usage of each of the endpoint devices 118 that is based at least in part on how the given endpoint device 118 is used (e.g., based on deployment modifications 126 and/or deployment usage 128). A departure for the established baseline pattern for a given endpoint 118, a mismatch value 162 is determined. Different endpoint devices (e.g., operated by different users with different habits) may have different allowable usage patterns indicated in the alert/intervention model 138, such that security responses 160 can be tailored to each endpoint device 118 (e.g., or the corresponding user(s)). Depending on the magnitude of the mismatch value 162, an appropriate action 164 is recommended to resolve any security concerns efficiently and reliably. Since endpoint device 118 can continuously monitor usage characteristics (e.g., the deployment modifications 126 and/or deployment usage 128), these actions 164 can be recommended and/or implemented in near real-time.

As described above, certain endpoint users may attempt to mask malicious actions. If the deployment usage 128 for a given endpoint device 118 suddenly changes, this may be flagged as a mismatch 162 even if this deployment usage 128 is otherwise considered allowable, because the change in deployment usage 128 may signal a subtle or masked malicious activity. Examples of such deployment usage 128 that may signal a subtle or masked malicious activity include adding to a script that would create a service, modifying a registry key to automatically execute certain actions, or pushing down a new binary or DLL that is not pushed during normal patching hours and has a hash different than that of the original file.

The security alert and intervention system 130 may be indexed and searchable (e.g., by the administrator device 168). This may allow an administrator, for example, that desires to identify an endpoint device 118 that had a known malicious file to identify endpoint devices with this malicious file. An application programming interface (API) 166 may further allow external applications (e.g., at an administrator device 168) to automate data retrieval and remediation efforts, for example, to block ports of an endpoint device 118, remove an endpoint device 118 from a network or subnetwork, shut down a service on an endpoint device 118, or the like.

A. Deployment Repository

The deployment repository 102 is generally a data store, or database, configured to store one or more deployments 110. A deployment 110 generally refers to an operating system 112 that can be executed by associated endpoint devices 118, applications 114 that can be executed by the endpoint devices 118, and/or rules 116 defining which endpoint devices 118 (or associated users) can access the operating systems 112 and/or applications 114. For instance, a deployment 110 may include a disk image of an operating system 112 and/or application 114 that can be readily loaded on an endpoint device 118. An entity or organization operating the deployment repository 102 may have a number of preconfigured deployments 110 that are intended for use on endpoint devices 118 for users who perform different tasks. For example, a common deployment 110 may be available to all endpoint devices 118, while rules 116 may indicate that higher level deployments 110 (e.g., with more complex operating system features and/or applications 114) may be provided only to endpoint devices 118 of more advanced users or users performing specific tasks requiring these features. As described in greater detail below with respect to the security alert and intervention system 130, the deployments 110 of the deployment repository 102 are used to determine baseline deployment properties 140 and generate an alert/intervention model 138.

The deployment repository 102 generally includes a processor 104, memory 106, and network interface 108. The processor 104 of the deployment repository 102 includes one or more processors. The processor 104 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 104 may be a programmable logic device, a microcontroller, a microprocessor, or any suitable combination of the preceding. The processor 104 is communicatively coupled to and in signal communication with the memory 106 and network interface 108. The one or more processors are configured to process data and may be implemented in hardware and/or software. For example, the processor 104 may be 8-bit, 16-bit, 32-bit, 64-bit or of any other suitable architecture. The processor 104 may include an arithmetic logic unit (ALU) for performing arithmetic and logic operations, processor registers that supply operands to the ALU and store the results of ALU operations, and a control unit that fetches instructions from memory 106 and executes them by directing the coordinated operations of the ALU, registers and other components.

The memory 106 of the deployment repository 102 is operable to store deployments 110 and any data, instructions, logic, rules, or code operable to execute the functions of the deployment repository 102. The memory 106 includes one or more disks, tape drives, or solid-state drives, and may be used as an over-flow data storage device, to store programs when such programs are selected for execution, and to store instructions and data that are read during program execution. The memory 106 may be volatile or non-volatile and may include read-only memory (ROM), random-access memory (RAM), ternary content-addressable memory (TCAM), dynamic random-access memory (DRAM), and static random-access memory (SRAM).

The network interface 108 of the deployment repository 102 is configured to enable wired and/or wireless communications. The network interface 108 is configured to communicate data between the deployment repository 102 and other network devices, systems, or domain(s), such as the endpoint devices 118 and the security alert and intervention system 130. The network interface 108 is an electronic circuit that is configured to enable communications between devices. For example, the network interface 108 may include one or more serial ports (e.g., USB ports or the like) and/or parallel ports (e.g., any type of multi-pin port) for facilitating this communication. As a further example, the network interface 108 may include a cellular communications interface, WIFI interface, a local area network (LAN) interface, a wide area network (WAN) interface, a modem, a switch, or a router. The processor 104 is configured to send and receive data using the network interface 108. The network interface 108 may be configured to use any suitable type of communication protocol. The network interface 108 communicates deployments 110 to other components of the system 100.

B. Endpoint Devices

The endpoint device(s) 118 are generally any computing devices operable to receive deployments 110 and execute the operating systems 112 and/or applications 114 to perform their corresponding functions. For example, a code execution device 118 may be a computer, a mobile device, a tablet device, a personal assistant device, or the like. The endpoint devices 118 may also track deployment modifications 126 and/or deployment usage 128. For example, an endpoint device 118 may record a log of deployment modifications 126 indicating any changes to the configuration of the operating system 112 and/or applications 114. The deployment modifications 126 may indicate changes to file access privileges, file locations, network connection protocols, and the like. Similarly, an endpoint device 118 may record a log of deployment usage 128 indicating how the operating system 112 and/or applications 114 are used at the endpoint device 118. For example, the deployment usage 128 may indicate which files are accessed, a frequency of file access, networks to which the endpoint device 118 connects, a frequency of such network connections, and the like. In some embodiments, the security alert and intervention system 130 may detect and track at least a portion of the deployment modifications 126 and/or deployment usage 128 of endpoint devices 118. If a security compromise is detected by the security alter and intervention system 130, a capability modification 190 may alter or disable certain capabilities of the endpoint device 118 (e.g., by restricting application access, file access, network access, or the like).

If security compromising deployment modifications 126 and/or deployment usage 128 are performed, the code execution device(s) 118 may inappropriately access information or perform tasks that may be security compromising or have some malicious intent. As an example, after a deployment modification 126, the operating system 112 executed by an endpoint device 118 may perform malicious functions, such as exposing secure data stored on the endpoint device 118 to untrusted parties. For instance, file access privileges within an operating system 112 may be changed by a deployment modification 126, resulting in potential exposure of secure information. As another example, deployment usage 128 may indicate the potential for exposure of secure information. For instance, deployment usage 128 may indicate that an endpoint device 118 is connected to an unknown network and/or accessing security compromising data. In some cases, the deployment usage 128 of multiple endpoint devices 118 in combination may be used to detect a potential security compromise. For instance, if the deployment usage 128 of two endpoint devices 118 indicates that both devices 118 are simultaneously connecting to an unknown network at the same time, a security response 160 may be determined as described further below to counteract any potential security compromise. As described further below, by determining security responses 160 that indicate both information about a mismatch 162 between a deployment 110 executed by an endpoint device 118 and the original deployment 110 as configured at the deployment repository 102, the security alert and intervention system 130 helps prevent a wide variety of potential security compromises at the endpoint devices 118.

Each of the endpoint device(s) 118 includes a processor 120, memory 122, and network interface 124. The processor 120 of the endpoint device(s) 118 includes one or more processors. The processor 120 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 120 may be a programmable logic device, a microcontroller, a microprocessor, or any suitable combination of the preceding. The processor 120 is communicatively coupled to and in signal communication with the memory 122 and network interface 124. The one or more processors are configured to process data and may be implemented in hardware and/or software. For example, the processor 120 may be 8-bit, 16-bit, 32-bit, 64-bit or of any other suitable architecture. The processor 120 may include an arithmetic logic unit (ALU) for performing arithmetic and logic operations, processor registers that supply operands to the ALU and store the results of ALU operations, and a control unit that fetches instructions from memory 122 and executes them by directing the coordinated operations of the ALU, registers and other components.

The memory 122 of the endpoint device(s) 118 is operable to store deployment 110, deployment modifications 126, deployment usage 128, and any data, instructions, logic, rules, or code operable to execute the functions of the endpoint device(s) 118. The memory 122 includes one or more disks, tape drives, or solid-state drives, and may be used as an over-flow data storage device, to store programs when such programs are selected for execution, and to store instructions and data that are read during program execution. The memory 122 may be volatile or non-volatile and may include read-only memory (ROM), random-access memory (RAM), ternary content-addressable memory (TCAM), dynamic random-access memory (DRAM), and static random-access memory (SRAM).

The network interface 124 of the endpoint device(s) 118 is configured to enable wired and/or wireless communications. The network interface 124 is configured to communicate data between endpoint device(s) 118 and other network devices, systems, or domain(s), such as the deployment repository 102 and security alert and intervention system 130. The network interface 124 is an electronic circuit that is configured to enable communications between devices. For example, the network interface 124 may include one or more serial ports (e.g., USB ports or the like) and/or parallel ports (e.g., any type of multi-pin port) for facilitating this communication. As a further example, the network interface 124 may include a cellular communications interface, WIFI interface, a local area network (LAN) interface, a wide area network (WAN) interface, a modem, a switch, or a router. The processor 120 is configured to send and receive data using the network interface 124. The network interface 124 may be configured to use any suitable type of communication protocol. The network interface 124 communicates (e.g., by sending and/or receiving) deployment 110, deployment modifications 126, deployment usage 128, and capability modification 190.

C. Security Alert and Intervention System

The security alert and intervention system 130 is one or more devices (e.g. implemented as a server) configured to determine a security response 160 based at least in part on deployment properties 158 associated with deployment modifications 126 and/or deployment usage 128 of a deployment 110 executed at an endpoint device 118. A security response 160 may be used to improve the security of endpoint devices 118, for example, by helping to prevent or reduce security compromising deployment modifications 126 and/or deployment usages 128 from being allowed to proceed.

The security alert and intervention system 130 uses a specially generated artificial intelligence (AI) alert/intervention model 138 to aid in determining the security response 160. The alert/intervention model 138 may be trained using baseline deployment properties 140 of the deployments 110 (e.g., the operating systems 112, applications 114, and/or access rules 116) stored by the deployment repository 102. The security alert and intervention system 130 may determine the baseline deployment properties 140 by accessing the deployment repository 102 and determining characteristics of each of the stored deployments 110. The baseline deployment properties 140 may include, for each of the deployments 110 (i) an identifier 142 of the operating system 112 and/or application 114, (ii) a type 144 of the operating system 112 and/or application 114, (iii) a source 146 of the operating system 112 and/or application 114, (iv) a hash 148 associated with the operating system 112 and/or application 114, (v) a relationship 150 indicating how the operating system 112 and/or application 114 is related to other operating systems and/or applications, (vi) file locations 152 indicating where data and/or instructions used to execute the operating system 112 and/or application 114 are stored, (vii) functions 154 performed to execute the operating system 112 and/or application 114, and (viii) and usage records 156 for the operating system 112 and/or application 114.

The identifier 142 of the operating system 112 and/or application 114 may be a name or other identifying alphanumeric designation for the operating system 112 and/or application 114. The type 144 of the operating system 112 and/or application 114 may be the type of operating system 112 and/or application 114 (e.g., a category in which the operating system 112 or application can be classified). The source 146 of the operating system 112 and/or application 114 may be the publisher of the operating system 112 and/or application 114 or a deployment repository 102 from which the operating system 112 and/or application 114 is provided. The hash 148 associated with the operating system 112 and/or application 114 may be a numeric or alphanumeric string generated for the operating system 112 and/or application 114. The hash 148 may be generated by applying a hash function to an image of the operating system 112 and/or application 114. The relationship 150 may indicate how the operating system 112 and/or application 114 is related to other operating systems 112 and/or applications 114. For example, a given operating system 112 may be a newer release version (e.g. version 2.0) compared to another operating system (e.g., version 1.0). These and similar links between operating systems 112 and/or applications 114 may be indicated in the relationship 150. The file locations 152 indicate where data and/or instructions used to execute the operating system 112 and/or application 114 are stored (e.g., in certain file folders, registries, etc.) in endpoint device(s) 118. The functions 154 are operations that are performed to execute the operating system 112 and/or application 114 (e.g., as a table or list of such functions 154). The usage records 156 for the operating system 112 and/or application 114 may include records of how the operating system 112 and/or application 114 have been distributed, used, and/or changed over time.

The AI alert and intervention model 138 is configured to determine a security response 160 based at least in part on the endpoint deployment properties 158 for an endpoint device 118 being analyzed by the security alert and intervention system 130. The AI alert/intervention model 138 is generally trained using the baseline deployment properties 140. The AI alert/intervention model 138 may also be determined based at least in part on information from other software references, such as the NIST Software Reference Library (NSRL). Software profiles from such sources may augment the information available in the baseline deployment properties 140. The alert and intervention model 138 may "learn" standard or baseline usage of endpoint devices 118 and determine appropriate security responses 160 if observed deployment usage 128 departs from this baseline usage. Further details of the generation and update of the AI alert and intervention model 138 is described with respect to FIG. 3 below.

The security alert and intervention system 130 determines deployment properties 158 that are then provided as an input to the AI alert and intervention model 138 in order to determine an appropriate security response 160. The deployment properties 158 include characteristics of the operating system 112 and/or applications 114 deployed at (e.g., executed by) the endpoint device 118 that is being evaluated by the security alert and intervention system 130. The deployment properties 158 include the deployment modifications 126 that have been made to the deployed operating system 112 and/or applications 114 and the deployment usage 128 of the deployed operating system 112 and/or applications 114.

By providing the deployment properties 158 as an input to the artificial intelligence model 138, a security response 160 is determined that includes a mismatch value 160. The mismatch value 162 corresponds to, or quantifies, an amount that the deployment properties 158 for the endpoint device 118 (e.g., following a certain deployment modification 126 and/or deployment usage 128) are different than the baseline deployment properties 140. Based on the mismatch value 162, an appropriate action 164 is determined that can be performed to improve security of the deployed operating system 112 and/or applications 114 executed by the endpoint device 118. The determined action 164 is then executed to improve security of the endpoint device 118. For example, the action 164 may include providing the security response 160 with an alert 178 to the administrator device 168 (described in greater detail below) and/or initiating a capability modification 190 at the endpoint device 118.

Figure 2:
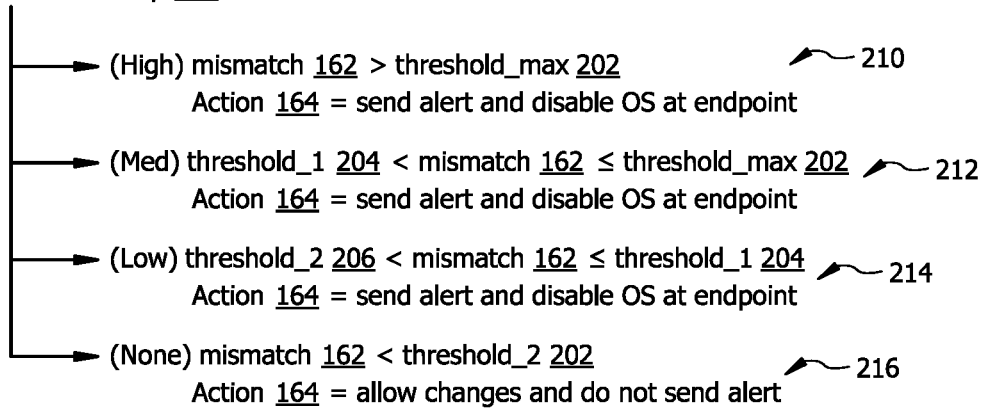
FIG. 2 is a diagram illustrating an example security response action hierarchy that may be implemented by the system of FIG. 1.

In some embodiments, the action 164 determined by the security alert and intervention system 130 follows a specially structured response hierarchy that balances the needs to allow users the latitude to operate endpoint devices 118 to complete work tasks while still prioritizing device security. FIG. 2 illustrates an example response hierarchy 200. The hierarchy 200 includes a high level response 210, a medium level response 212, a low level response 214, and a "none" level response 216. The high level response 210 corresponds to the case where the mismatch value 162 is greater than a maximum threshold value 202. For the high level response 210, the action 164 may include sending the security response 160 with an alert 178 to the administrator device 168 and disabling the operating system 112 (and/or one or more applications 114) at the endpoint device 118. For example, after determining that the mismatch value 162 is greater than the maximum threshold value 202, the security alert and intervention system 130 may execute the determined action 164 by providing the security response 160 to the administrator device 168 with alert 178 indicating a high alert level and stopping execution of the deployed operating system 112 and/or application(s) 114 by the endpoint device 118. Execution of the deployed operating system 112 and/or application(s) 114 may be stopped using a capability modification 190 that causes the endpoint device 118 to no longer be capable of executing the deployed operating system 112 and/or application(s) 114.

The medium level response 212 corresponds to the case where the mismatch value 162 is less than or equal to the maximum threshold value 202 and greater than a first threshold value 204. For the medium level response 212, the action 164 may include sending the security response 160 with an alert 178 to the administrator device 168 and temporarily delaying changes or limiting usage of the operating system 112 (and/or one or more applications 114) at the endpoint device 118. For example, after determining that the mismatch value 162 is less than or equal to the maximum threshold value 202 and greater than the first threshold value 204, the determined action 164 may be executed by providing the security response 160 to the administrator device 168 with an alert 178 requesting confirmation to allow continued execution of the deployed operating system 112 and/or applications 114 by the endpoint device 118. The security alert and intervention system 130 may cause a capability modification 190 that provisionally prevents execution of at least a portion of the functions of the deployed operating system 112 and/or application(s) 114 on the endpoint device 118 (e.g., at least until an administrator reply 186 is received). If a received administrator reply 186 indicates to allow execution of the deployed operating system 112 and/or application(s) 114, a new capability modification 190 is provided that stops preventing execution of the functionality of the operating system 112 and/or application(s) 114. Conversely, if a received administrator reply 186 indicates to prevent execution of the deployed operating system 112 and/or application(s), the security alert and intervention system 130 may continue preventing execution of or access to functionality of the deployed operating system 112 and/or application(s) 114.

The low level response 214 corresponds to the case where the mismatch value 162 is less than or equal to the first threshold value 204 and greater than a second threshold value 206. For the low level response 214, the action 164 may include sending the security response 160 to the administrator device 168 (e.g., for record keeping) and allowing changes and usage of the operating system 112 (and/or one or more applications 114) at the endpoint device 118. For example, after determining that the mismatch value 162 is less than or equal to the first threshold value 204 and greater than the second threshold value 206, the determined action 164 may be executed by providing the security response 160 to the administrator device 168 with an indication of a low alert level and allowing execution of the deployed operating system 112 and/or application(s) 114 on the endpoint device 118. A "none" level response 216 may be determined if the mismatch value 162 is less than the second threshold value 206. For the "none" level response 216, the action 164 may include neither sending the security response 160 to the administrator device 168 nor causing a capability modification 190.

Returning to FIG. 1, the security alert and intervention system 130 includes a processor 132, memory 134, and network interface 136. The processor 132 includes one or more processors. The processor 132 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 132 may be a programmable logic device, a microcontroller, a microprocessor, or any suitable combination of the preceding. The processor 132 is communicatively coupled to and in signal communication with the memory 134 and network interface 136. The one or more processors are configured to process data and may be implemented in hardware and/or software. For example, the processor 132 may be 8-bit, 16-bit, 32-bit, 64-bit or of any other suitable architecture. The processor 132 may include an arithmetic logic unit (ALU) for performing arithmetic and logic operations, processor registers that supply operands to the ALU and store the results of ALU operations, and a control unit that fetches instructions from memory 134 and executes them by directing the coordinated operations of the ALU, registers and other components.

The memory 134 is operable to store baseline deployment properties 140, deployment properties 158, AI alert/intervention model 138, security responses 160, and any data, instructions, logic, rules, or code operable to execute the functions of the security alert and intervention system 130. The memory 134 includes one or more disks, tape drives, or solid-state drives, and may be used as an over-flow data storage device, to store programs when such programs are selected for execution, and to store instructions and data that are read during program execution. The memory 134 may be volatile or non-volatile and may include read-only memory (ROM), random-access memory (RAM), ternary content-addressable memory (TCAM), dynamic random-access memory (DRAM), and static random-access memory (SRAM).

The network interface 136 is configured to enable wired and/or wireless communications. The network interface 136 is configured to communicate data between the security alert and intervention system 130 and other network devices, systems, or domain(s), such as the deployment repository 102, endpoint devices 118, and the administrator device 168. The network interface 136 is an electronic circuit that is configured to enable communications between devices. For example, the network interface 136 may include one or more serial ports (e.g., USB ports or the like) and/or parallel ports (e.g., any type of multi-pin port) for facilitating this communication. As a further example, the network interface 136 may include a cellular communications interface, a WIFI interface, a local area network (LAN) interface, a wide area network (WAN) interface, a modem, a switch, or a router. The processor 132 is configured to send and receive data using the network interface 136. The network interface 136 may be configured to use any suitable type of communication protocol.

D. Administrator device

The administrator device 168 is generally any computing device operable to receive a security response 160, receive a user input 184 corresponding to an indication to allow/prevent a change 188, and provide a corresponding administrator reply 186 to the security alert and intervention system 130. For example, an administrator device 168 may be a computer, a mobile device, a tablet device, a personal assistant device, or the like. In certain embodiments, all or a portion of the functions of the administrator device 168 are performed by the security alert and intervention system 130. In other words, the security alert and intervention system 130 and administrator device 168 may be the integrated into the same device or system. An application programming interface (API) 166 may facilitate communication between the administrator device 168 and the security alert and intervention system 130.

The administrator device 168 includes a processor 170, memory 172, network interface 174, and user interface 176. The processor 170 includes one or more processors. The processor 170 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 170 may be a programmable logic device, a microcontroller, a microprocessor, or any suitable combination of the preceding. The processor 170 is communicatively coupled to and in signal communication with the memory 172, network interface 174, and user interface 176. The one or more processors are configured to process data and may be implemented in hardware and/or software. For example, the processor 170 may be 8-bit, 16-bit, 32-bit, 64-bit or of any other suitable architecture. The processor 170 may include an arithmetic logic unit (ALU) for performing arithmetic and logic operations, processor registers that supply operands to the ALU and store the results of ALU operations, and a control unit that fetches instructions from memory 172 and executes them by directing the coordinated operations of the ALU, registers and other components.

The memory 172 is operable to store security responses 160, new baseline deployment properties 180, and any data, logic, rules, or code operable to execute the functions of the administrator device 168. The memory 172 includes one or more disks, tape drives, or solid-state drives, and may be used as an over-flow data storage device, to store programs when such programs are selected for execution, and to store instructions and data that are read during program execution. The memory 172 may be volatile or non-volatile and may include read-only memory (ROM), random-access memory (RAM), ternary content-addressable memory (TCAM), dynamic random-access memory (DRAM), and static random-access memory (SRAM).

The network interface 174 is configured to enable wired and/or wireless communications. The network interface 174 is configured to communicate data between the administrator device 168 and other network devices, systems, or domain(s), such as the security alert and intervention system 130 (e.g., via API 166). The network interface 174 is an electronic circuit that is configured to enable communications between devices. For example, the network interface 174 may include one or more serial ports (e.g., USB ports or the like) and/or parallel ports (e.g., any type of multi-pin port) for facilitating this communication. As a further example, the network interface 174 may include a cellular communications interface, a WIFI interface, a local area network (LAN) interface, a wide area network (WAN) interface, a modem, a switch, or a router. The processor 170 is configured to send and receive data using the network interface 174. The network interface 174 may be configured to use any suitable type of communication protocol.

The user interface 176 of the administrator device 168 is configured to present the recommended security response 160, a field for providing or selecting new deployment properties 180, and a field for input or selection to initiate or over-ride 182 the recommended security response 160. The user interface 146 may include or be presented on electronic display such as an LCD screen, an LED display, a plasma display, or the like. The user interface 176 is communicatively coupled to the processor 170 and configured to present information to an administrator overseeing usage of the deployments 110 stored in the deployment repository 102. In addition to the mismatch value 162 and action 164 (described above), the recommended response 160 displayed in the user interface 176 may include an alert 178. The alert 178 may indicate an alert level (see FIG. 2) that helps improve the reliability and efficiency of the information presented in the administrator device 168. A user input 184 may be received that indicates new baseline deployment properties 180 to include in the baseline deployment properties 140. As described with respect to FIG. 3 below, the AI alert/intervention model 138 may be retrained using the new baseline deployment properties 180 to improve system performance. A user input 184 may also indicate whether to initiate or override 182 the recommended security response 160. This selection adjusts whether the administrator reply 186 indicates to allow/prevent a change 188 corresponding to a deployment modification 126 and/or deployment usage 128.

Figure 3:
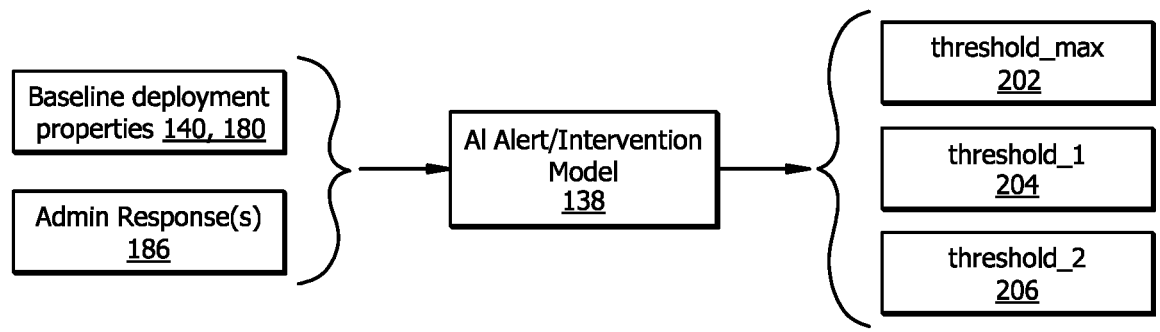
FIG. 3 is a diagram illustrating updating of the alert/intervention model executed by the system of FIG. 1.

As described above, in some cases, the AI alert/intervention model 138 may be trained using a variety of information which may be updated over time. Example training and updating of the AI alert/intervention model 138 is illustrated in FIG. 3, which shows a number of example training inputs (e.g., baseline deployment properties 140, 180 and administrator responses 186) and example outputs (e.g., the thresholds 202, 204, 206 of FIG. 2). For example, if new baseline deployment properties 180 are indicated in the user interface 176 (see FIG. 1), the AI alert/intervention model 138 may be updated, and new threshold values 202, 204, 206 may be determined for implementing hierarchical security response actions 164 (see FIG. 2). As another example, after a number of administrator responses 186 are received for various security responses 160, the AI alert/intervention model 138 may be similarly updated. For instance, if administrator responses 186 indicate to prevent/allow endpoint capabilities for certain mismatch values 162 and/or implement certain actions 164, the thresholds 202, 204, 206 may be adjusted to make these administrator approved outcomes more likely in the future. In this way, the AI alert/intervention model 138 is continuously improved over time and can account for changes in both the baseline deployments 110 and administrator preferences over time.

Returning to FIG. 1, in an example operation of the endpoint security system 100, a deployment modification 126 for a given endpoint device 118 indicates that an access level has been changed for a file folder containing secure information or a secure executable file. In a first response scenario, the endpoint device 118 is operated by a user with a low or normal level security access privileges. In this first response scenario, the security alert and intervention system 130 determines a security response 160 with a high level action 164 (see level 210 of FIG. 2). The security alert and intervention system 130 causes a capability modification 190 that prevents the user from using an operating system 112 on the endpoint device 118. An alert 178 is also provided to the administrator device 168 to inform of the high level event. In this example scenario, some explanation or change to the file location security policy must be made before the user can use the operating system 112. In a second response scenario, the endpoint device 118 is operated by a user with high level security access privileges. In this second response scenario, the security alert and intervention system 130 determines a security response 160 with a low level action 164 (see level 214 of FIG. 2). The security alert and intervention system 130 allows the user to continue using the endpoint device 118 as usual but an alert 178 is still provided to the administrator device 168. In this way, an administrator may choose to review the usage of the endpoint device 118 in more detail.

In another example operation of the endpoint security system 100, a deployment modification 126 for an endpoint device 118 indicates that a registry key has been added to a registry of the endpoint device 118. The security alert and intervention system 130 may determine a security response 160 with an action 164 to implement a capability modification 190 that prevents functions from this modified registry from being executed. This might prevent execution of all or a portion of functions of an operating system 112 and/or application(s) 114 of the endpoint device 118. If an administrator decides this change to the registry is appropriate, an administrator reply 186 that allows the change 188 may be provided. A further capability modification 190 may be implemented that allows functions from the modified registry to be executed.

In another example operation of the endpoint security system, deployment usage 128 indicates that the endpoint device 118 is connecting to an unknown network. The security alert and intervention system 130 may determine a security response 160 with an action 164 to prevent access to this network and execute a capability modification 190 that stops connection to the unknown network. The administrator device 168 receives an alert 178 indicating that the endpoint device 118 is connecting to the unknown network. If an administrator decides this connection is appropriate, an administrator reply 186 that allows the change 188 may be provided.

In yet another example operation of the endpoint security system, deployment usage 128 indicates that two different endpoint device 118 is connecting to the same network that is not commonly used by the endpoint devices 118. In this scenario, the security alert and intervention system 130 may determine an action 164 to stop this uncommon network connection at least until an administrator reply 186 indicates to allow this usage change 188.

Example Method of Operating the Security Alert and Intervention System

Figure 4:
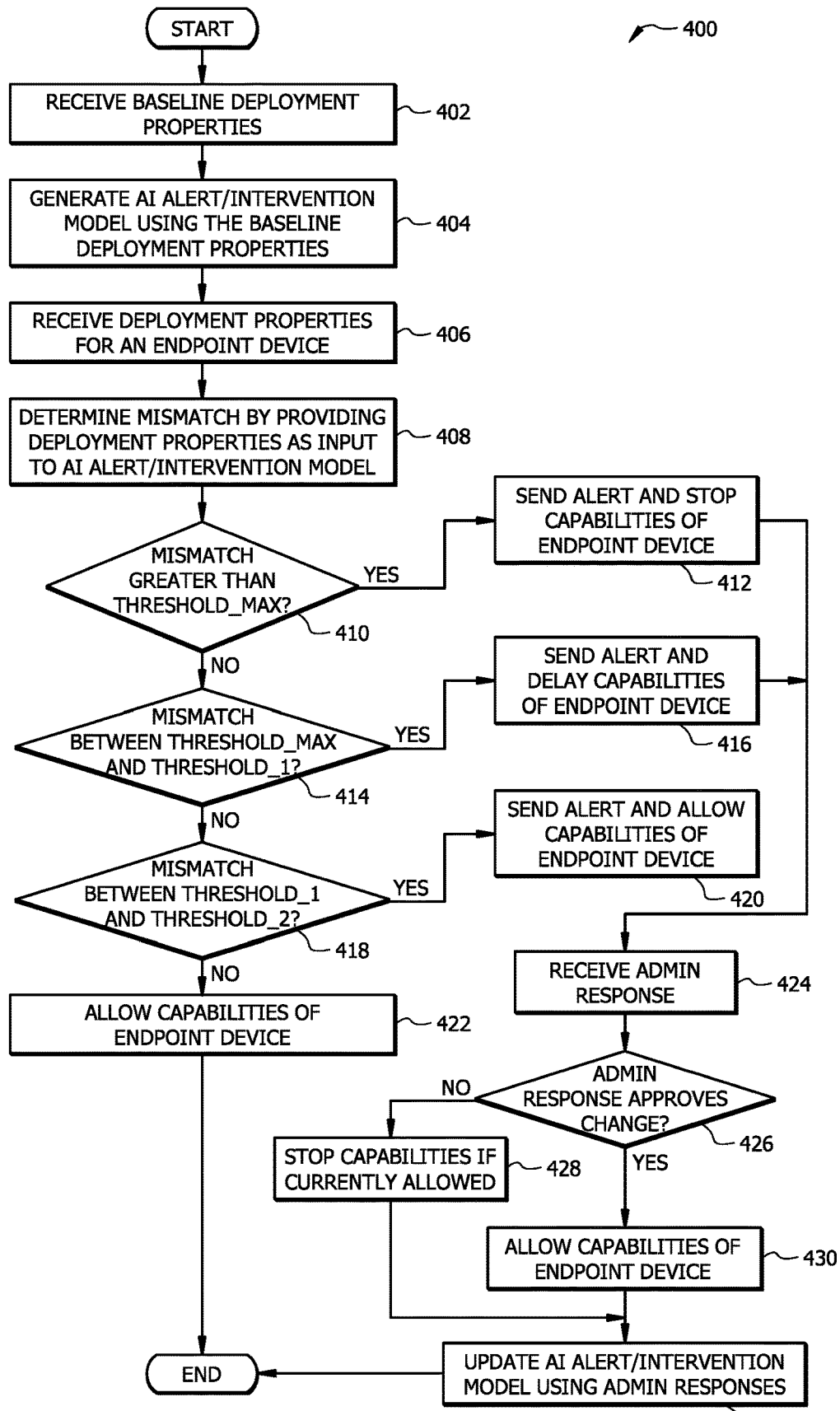
FIG. 4 is a flowchart illustrating an example operation of the system of FIG. 1.

FIG. 4 illustrates an example method 400 of operating the system 100 of FIG. 1. The method 400 may be integrated into the practical application of improving the security of a deployment 110, such as the deployed operating system 112 and/or applications 114 executed within this operating system 112. The method 400 may be performed using the processor 132, memory 134, and network interface 136 of the security alert and intervention system 130. In some embodiments, one or more operations of the method 400 may be performed by another component of the system 100, such as the deployment repository 102, endpoint device 118, and/or administrator device 168. The method 400 may begin at operation 402 where baseline deployment properties 140 are received from the deployment repository 102.

At operation 404, the security alert and intervention system 130 generates the AI alert/intervention model 138 using the baseline deployment properties 140. The alert/intervention model 138 may determine a standard or baseline usage of various endpoint devices 118, such that future departures from this standard/baseline can be detected and appropriate corrective action can be taken. For example, as described with respect to the example of FIG. 3 above, values of thresholds 202, 204, 206 may be determined that indicate what hierarchical action 164 should be initiated for a given mismatch value 162.

At operation 406, deployment properties 158 are received and/or determined for one or more endpoint devices 118 that are to be accessed for security compromise. The deployment properties 158 may include characteristics of the operating system 112 and/or applications 114 deployed at (e.g., executed by) the endpoint device 118 that is being evaluated by the security alert and intervention system 130.

At operation 408, a mismatch value 162 is determined for the endpoint device(s) 118 being evaluated. The mismatch value 162 generally quantifies an extent or amount of difference between the deployment properties 158 of an endpoint device 118 and the baseline deployment properties 140. For example, the mismatch value 162 may quantify a difference between a standard or baseline usage established by the alert/intervention model 138 and the observed deployment usage 128 indicated in deployment properties 158. The mismatch value 162 is determined by the AI alert/intervention model 138.

At operation 410, the security alert and intervention system 130 determines whether the mismatch value 162 is greater than the maximum threshold value 202 (see high level response 210 of FIG. 2). If this is the case, the security alert and intervention system 130 proceeds to operation 412 and sends the security response 160 with an alert 178 indicating a high alert level and executes a capability modification 190 that stops at least a portion of the capabilities of the endpoint device 118. If the criteria at operation 410 are not satisfied, the security alert and intervention system 130 proceeds to operation 414.

At operation 414, the security alert and intervention system 130 determined whether the mismatch value 162 is less than or equal to the maximum threshold value 202 and greater than the first threshold value 204 (see medium level response 212 of FIG. 2). If this is the case, the security alert and intervention system 130 proceeds to operation 416 and sends the security response 160 with an alert 178 indicating a medium alert level and executes a capability modification 190 that temporarily stops at least a portion of the capabilities of the endpoint device 118. If the criteria at operation 414 are not satisfied, the security alert and intervention system 130 proceeds to operation 418.

At operation 418, the security alert and intervention system 130 determines whether the mismatch value 162 is less than or equal to the first threshold value 204 and greater than the second threshold value 206 (see low level response 214 of FIG. 2). If this is the case, the security alert and intervention system 130 proceeds to operation 420 and sends the security response 160 with an alert 178 indicating a low alert level and does not execute a capability modification 190. If the criteria at operation 418 are not satisfied, the security alert and intervention system 130 proceeds to operation 422 where endpoint capabilities are allowed (e.g., by not making a capability modification 190). Operation 422 corresponds to the action 164 for a "none" level alert 216 of FIG. 2.

At operation 424, an administrator response 186 is received. As described above with respect to FIG. 1, the administrator response 186 may include an indication of whether to prevent or allow a change or usage 188 of the endpoint device 118. At operation 426, the security alert and intervention system 130 determines whether the administrator response 186 indicates to approve the endpoint device's operations. If the operations are approved, the security alert and intervention system 130 proceeds to operation 430 and allows the capabilities of the endpoint device 118. However, if the operations are not approved at operation 426, the security alert and intervention system 130 proceeds to operation 428 and stops capabilities of the endpoint device (e.g., by providing a capability modification 190). At operation 432, the AI alert/intervention model 138 may be updated based on the administrator response 186, as described in greater detail with respect to FIG. 3 above. For example, standard or baseline deployment usage may be determined by the AI alert/intervention model 138 in order to better detect departures from this standard/baseline in future deployment usage 128.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
  a deployment repository comprising a first memory configured to store operating system deployments indicating configurations of one or more operating systems that are configured to be executed by endpoint devices;
  an endpoint device executing a deployed operating system, the endpoint device configured to record one or both of modifications to the deployed operating system and usage of the deployed operating system; and
  a security assessment and intervention system comprising:
    a network interface configured to receive:
      baseline deployment properties of the operating system deployments stored by the deployment repository; and
      endpoint deployment properties of the deployed operating system executed by the endpoint device, wherein the endpoint deployment properties comprise one or more of the modifications to the deployed operating system recorded by the endpoint device and the usage of the deployed operating system recorded by the endpoint device;
    a second memory operable to store an artificial intelligence model configured to determine a security response based at least in part on the endpoint deployment properties of the endpoint device; and
    a processor communicatively coupled to the network interface and the second memory and configured to:
      determine, by providing the endpoint deployment properties to the artificial intelligence model, a mismatch value corresponding to an amount that the endpoint deployment properties are different than the baseline deployment properties;

determine, based on the mismatch value, an action to improve security of the deployed operating system executed by the endpoint device; and execute the determined action to improve security of the deployed operating system.

2. The system of claim 1, wherein the processor is further configured to:

determine that the mismatch value is greater than a maximum threshold value;

after determining that the mismatch value is greater than the maximum threshold value, execute the determined action by:

providing an alert to administrator device indicating a high alert level; and stopping execution of the deployed operating system by the endpoint device.

3. The system of claim 1, wherein the processor is further configured to:

determine that the mismatch value is less than a maximum threshold value and greater than a first threshold value;

after determining that the mismatch value is less than the maximum threshold value and greater than the first threshold value, execute the determined action by:

providing an alert to administrator device requesting confirmation to allow to continue execution of the deployed operating system by the endpoint device; and provisionally preventing execution of the deployed operating system on the endpoint device at least until an administrator reply is received.

4. The system of claim 3, wherein the processor is further configured to:

receive the administrator reply indicating to allow or prevent execution of the deployed operating system by the endpoint device;

if the administrator reply indicates to allow execution of the deployed operating system by the endpoint device, stop preventing execution of the deployed operating system by the endpoint device; and if the administrator reply indicates to prevent execution of the deployed operating system by the endpoint device, continue preventing execution of the deployed operating system by the endpoint device.

5. The system of claim 1, wherein the processor is further configured to:

determine that the mismatch value is less than a first threshold value and greater than a second threshold value;

after determining that the mismatch value is less than the first threshold value and greater than the second threshold value, execute the determined action by:

providing an alert to administrator device indicating a low alert level; and allowing execution of the deployed operating system on the endpoint device.

6. The system of claim 1, wherein the baseline deployment properties comprise, for each of the one or more operating systems that are configured to be executed by endpoint devices, at least one of: (i) an identifier of the deployed operating system, (ii) a type of the deployed operating system, (iii) a source of the deployed operating system, (iv) a hash associated with the deployed operating system, (v) a relationship between the deployed operating system and other operating systems, (vi) file locations of data used to execute the deployed operating system, (vii) functions performed to execute the deployed operating system, (viii) and usage records for the deployed operating system.

7. The system of claim 1, wherein the processor is further configured to:

execute the determined action by providing an alert to an administrator device;

receive an administrator reply confirming or denying a modification to the deployed operating system executed by the endpoint device; and update the AI model based at least in part on the administrator reply, wherein updating the AI model comprises determine updated baseline usage of the endpoint device.

8. A method, comprising:

determining baseline deployment properties of operating system deployments stored by a deployment repository;

determining endpoint deployment properties of a deployed operating system executed by an endpoint device, wherein the endpoint deployment properties comprise one or more of modifications to the deployed operating system and usage of the deployed operating system;

determine, by providing the endpoint deployment properties to an artificial intelligence model configured to determine a security response based at least in part on the endpoint deployment properties of the endpoint device, a mismatch value corresponding to an amount that the endpoint deployment properties are different than the baseline deployment properties;

determining, based on the mismatch value, an action to improve security of the deployed operating system executed by the endpoint device; and executing the determined action to improve security of the deployed operating system.

9. The method of claim 8, further comprising:

determining that the mismatch value is greater than a maximum threshold value;

after determining that the mismatch value is greater than the maximum threshold value, executing the determined action by:

providing an alert to administrator device indicating a high alert level; and stopping execution of the deployed operating system by the endpoint device.

10. The method of claim 8, further comprising:

determining that the mismatch value is less than a maximum threshold value and greater than a first threshold value;

after determining that the mismatch value is less than the maximum threshold value and greater than the first threshold value, executing the determined action by:

providing an alert to administrator device requesting confirmation to allow to continue execution of the deployed operating system by the endpoint device; and provisionally preventing execution of the deployed operating system on the endpoint device at least until an administrator reply is received.

11. The method of claim 10, further comprising:

receiving the administrator reply indicating to allow or prevent execution of the deployed operating system by the endpoint device;

if the administrator reply indicates to allow execution of the deployed operating system by the endpoint device, stop preventing execution of the deployed operating system by the endpoint device; and if the administrator reply indicates to prevent execution of the deployed operating system by the endpoint device, continuing to prevent execution of the deployed operating system by the endpoint device.

12. The method of claim 8, further comprising:

determining that the mismatch value is less than a first threshold value and greater than a second threshold value;

after determining that the mismatch value is less than the first threshold value and greater than the second threshold value, executing the determined action by:

providing an alert to administrator device indicating a low alert level; and allowing execution of the deployed operating system on the endpoint device.

13. The method of claim 8, wherein the baseline deployment properties comprise, for each of the one or more operating systems that are configured to be executed by endpoint devices, at least one of: (i) an identifier of the deployed operating system, (ii) a type of the deployed operating system, (iii) a source of the deployed operating system, (iv) a hash associated with the deployed operating system, (v) a relationship between the deployed operating system and other operating systems, (vi) file locations of data used to execute the deployed operating system, (vii) functions performed to execute the deployed operating system, (viii) and usage records for the deployed operating system.

14. The method of claim 8, further comprising:

executing the determined action by providing an alert to an administrator device;

receiving an administrator reply confirming or denying a modification to the deployed operating system executed by the endpoint device; and updating the AI model based at least in part on the administrator reply, wherein updating the AI model comprises determining updated baseline usage of the endpoint device.

15. A security assessment and intervention system comprising:

a network interface configured to receive:

baseline deployment properties of operating system deployments stored by a deployment repository; and endpoint deployment properties of a deployed operating system executed by an endpoint device, wherein the endpoint deployment properties comprise one or more of modifications to the deployed operating system and usage of the deployed operating system;

a memory operable to store an artificial intelligence model configured to determine a security response based at least in part on the endpoint deployment properties of the endpoint device; and a processor communicatively coupled to the network interface and the memory and configured to:

determine, by providing the endpoint deployment properties to the artificial intelligence model, a mismatch value corresponding to an amount that the endpoint deployment properties are different than the baseline deployment properties;

determine, based on the mismatch value, an action to improve security of the deployed operating system executed by the endpoint device; and execute the determined action to improve security of the deployed operating system.

16. The system of claim 15, wherein the processor is further configured to:

determine that the mismatch value is greater than a maximum threshold value;

after determining that the mismatch value is greater than the maximum threshold value, execute the determined action by:

providing an alert to administrator device indicating a high alert level; and stopping execution of the deployed operating system by the endpoint device.

17. The system of claim 15, wherein the processor is further configured to:

determine that the mismatch value is less than a maximum threshold value and greater than a first threshold value;

after determining that the mismatch value is less than the maximum threshold value and greater than the first threshold value, execute the determined action by:

providing an alert to administrator device requesting confirmation to allow to continue execution of the deployed operating system by the endpoint device; and provisionally preventing execution of the deployed operating system on the endpoint device at least until an administrator reply is received.

18. The system of claim 17, wherein the processor is further configured to:

receive the administrator reply indicating to allow or prevent execution of the deployed operating system by the endpoint device;

if the administrator reply indicates to allow execution of the deployed operating system by the endpoint device, stop preventing execution of the deployed operating system by the endpoint device; and if the administrator reply indicates to prevent execution of the deployed operating system by the endpoint device, continue preventing execution of the deployed operating system by the endpoint device.

19. The system of claim 15, wherein the processor is further configured to:

determine that the mismatch value is less than a first threshold value and greater than a second threshold value;

after determining that the mismatch value is less than the first threshold value and greater than the second threshold value, execute the determined action by:

providing an alert to administrator device indicating a low alert level; and allowing execution of the deployed operating system on the endpoint device.

20. The system of claim 15, wherein the processor is further configured to:

execute the determined action by providing an alert to an administrator device;

receive an administrator reply confirming or denying a modification to the deployed operating system executed by the endpoint device; and update the AI model based at least in part on the administrator reply, wherein updating the AI model comprises determining updated baseline usage of the endpoint device.

* * * * *